United States Patent [19]

Turner

[11] Patent Number: 4,461,449

[45] Date of Patent: Jul. 24, 1984

[54] INTEGRAL HYDRAULIC BLOCKING AND RELIEF VALVE

[75] Inventor: Bernus G. Turner, Woodinville, Wash.

[73] Assignee: The Boeing Company, Seattle, Wash.

[21] Appl. No.: 386,470

[22] Filed: Jun. 8, 1982

Related U.S. Application Data

[63] Continuation of Ser. No. 145,511, May 1, 1980, abandoned.

[51] Int. Cl.[3] .......... F16K 31/122

[52] U.S. Cl. .......... 251/62; 91/420; 137/493; 137/495; 137/596.2; 244/78; 251/63.5

[58] Field of Search .......... 137/509, 493, 495, 596.2; 91/420; 244/78, 113, 42 D; 251/62, 63.5, 63.6

[56] References Cited

U.S. PATENT DOCUMENTS

| | | | |
|---|---|---|---|
| 2,653,626 | 9/1953 | Finlayson | 91/420 |
| 2,778,378 | 1/1957 | Presnell | 91/420 |
| 3,792,715 | 2/1974 | Parrett et al. | 137/493 |
| 3,857,404 | 12/1974 | Johnson | 91/420 |
| 3,942,550 | 3/1976 | Orme | 137/493 |
| 3,943,968 | 3/1976 | Treichler | 137/493 |
| 4,089,344 | 5/1978 | Flaschar et al. | 137/493 |

*Primary Examiner*—George L. Walton
*Attorney, Agent, or Firm*—Christensen, O'Connor, Johnson & Kindness

[57] ABSTRACT

A hydraulic blocking valve for use in an aircraft flight power actuator employs a unique stepped piston design referenced to return pressure which provides pressure relief at a fixed value independent of system pressure.

2 Claims, 3 Drawing Figures

INTEGRAL HYDRAULIC BLOCKING AND RELIEF VALVE

This is a continuation of application Ser. No. 145,511, filed May 1, 1980, now abandoned.

BACKGROUND OF THE INVENTION

The present invention pertains to the hydraulic valve art and, more particularly, to an improved integral blocking and relief valve.

Numerous hydraulic blocking valves have been developed in the prior art. A common application for such valves is in the aircraft flight power control actuator art wherein, for example, blocking valves are used in spoiler actuator systems. During flight, it is crucial to the safe operation of the aircraft that the spoiler be in its retracted position when not commanded otherwise. Thus, to prevent spoiler surface motion as a result of reduced system pressure or external loading, it has been common practice to employ a blocking valve which traps hydraulic fluid in the actuator thereby locking the spoiler in place.

The pressure of this trapped hydraulic fluid can increase due to thermal effects or external loading. To prevent an excessively high pressure build up, the prior art has utilized a thermal relief valve which bleeds fluid to system return until the pressure is relieved.

Attempts have been made in the prior art to combine both the blocking and relief valve functions in a single valve unit, thereby saving in weight, construction cost and space. A problem with one such design is that pressure relief is biased upwards by system pressure. That is, in this prior design the pressure relief occurs at nearly twice the pressure with system pressure on than it does when system pressure is off. A weight penalty is incurred in such actuator designs to accommodate the higher than desired working pressures.

In another previous integral blocking and relief valve design, the system is successful in providing a constant relief setting regardless of system pressure. However, this design utilizes a large number of parts thus rendering it expensive to manufacture and potentially less reliable in operation.

SUMMARY OF THE INVENTION

It is an object of this invention, therefore, to provide an improved integral blocking and relief valve which provides pressure relief at a fixed level independent of system pressure.

It is a further object of the invention to provide the above described improved integral blocking and relief valve which requires a minimum number of parts such that it is simple to manufacture and reliable in operation.

Briefly, according to the invention, the inventive integral blocking and relief valve blocks the flow of a hydraulic fluid unless the pressure of the blocked fluid exceeds a predetermined value. The valve is comprised of a first input port adapted to be connected to the hydraulic fluid source to be blocked and relieved. A first piston $P_A$ is slidably constrained in a first chamber, which first chamber is connected to the first input port. The piston $P_A$ has an area $A_A$ at a first end exposed to the hydraulic pressure in the first chamber. A second piston $P_B$ has a first portion which is slidably constrained in a pressure relief chamber. A second portion of piston $P_B$ is integral with the first end of the first portion and is slidably constrained in, and has an exposed area $A_{SB}$ to a relief bias chamber. A plunger portion extends from the second end of the first portion of piston $P_B$. A provided pressure bias port is adapted to be connected to a source of system hydraulic pressure. A bias chamber connects to the pressure bias port and joins the first chamber such that the second end of the first piston $P_A$ is in position to abut the free end of the second portion. A relief port is connected to the relief bias chamber and is adapted to be connected to the system return pressure. The second input port is connected to the pressure relief chamber and is adapted to be connected to a system controlled hydraulic flow line. A poppet valve is slidably constrained in a poppet chamber. The poppet chamber joins with the pressure relief chamber and the first input port such that hydraulic fluid at the first input port is controllably passed to the pressure relief chamber dependent on the position of the poppet. The poppet exposes an area $A_P$ to the pressure relief chamber and is engagable by the plunger portion of the second piston to drive the poppet to a position thereby allowing flow from the input port to the pressure relief chamber.

Preferably, the relationship between the second piston second portion exposed area, the first piston exposed area and the poppet exposed area is given by the relationship:

$$A_{SB} \simeq A_A - A_P. \quad [1]$$

A design according to this relationship provides pressure relief independent of the level of system pressure.

DETAILED DESCRIPTION OF THE PREFERRED EMBODIMENT OF THE INVENTION

Figure 1:
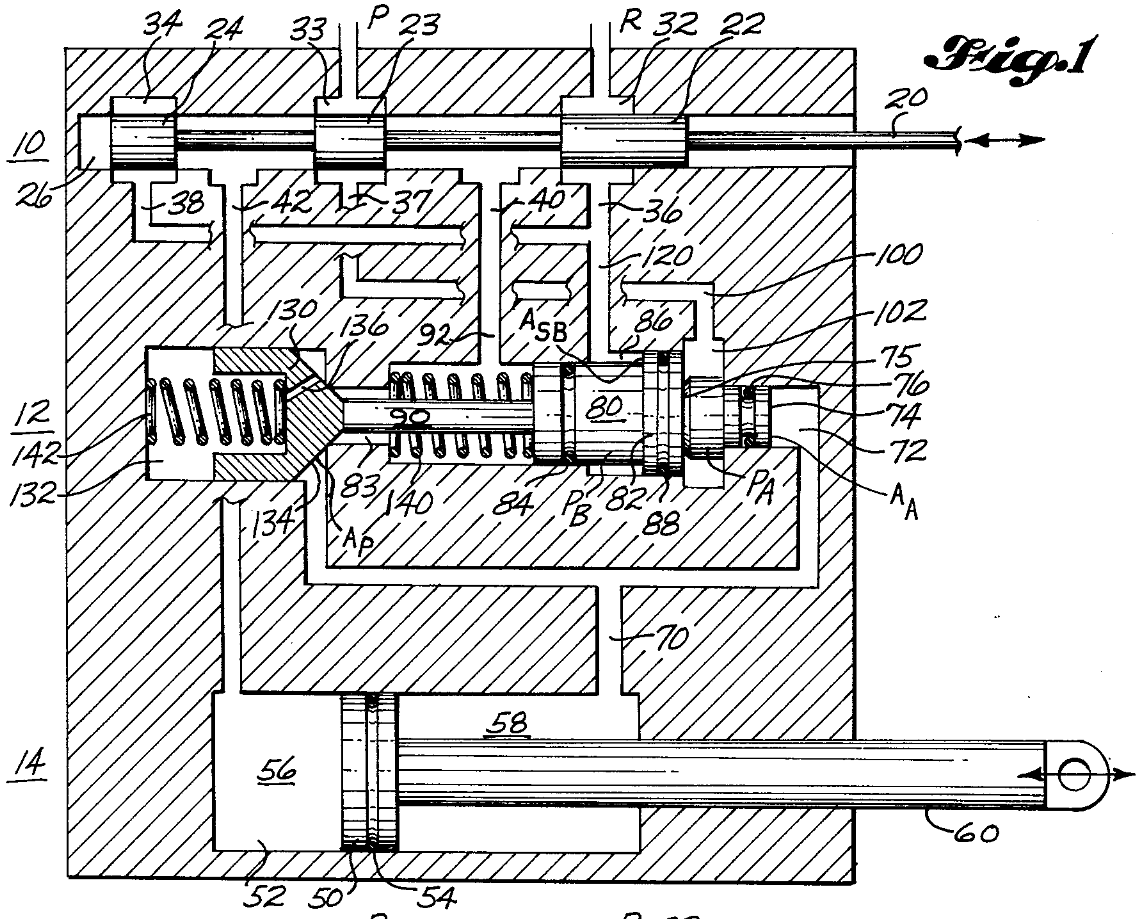
FIG. 1 is a cross-sectional view of the preferred embodiment of the integral blocking and relief valve in an aircraft spoiler actuator application.

FIG. 1 is a cross-sectional view of an aircraft spoiler actuator system incorporating a preferred embodiment of the instant integral blocking and relief valve. The basic system components include a control valve 10, the integral blocking and relief valve 12 and the actuator 14.

The control valve 10 is of conventional design being comprised of a spool 20 having a series of three land portions 22–24 provided thereon. The spool 20 and lands 22–24 are slidably constrained within a cylinder 26. A series of cavities 32–34 are associated with each land 22–24. In the present system, a source of high pressure hydraulic fluid is coupled to the cavity 33 whereas the return, or reservoir system pressure is coupled to cavity 32. Associated with each cavity is an exit port 36–38 with additional exit ports 40–42 being provided from the cavity 26. Thus, the control valve 10 responds to the position of the spool 20 within the cylinder 26 to meter hydraulic fluid into, and out of various of its ports.

As with the control valve 10, the actuator 14 is of conventional design. Thus, a piston 50 is slidably constrained within a cylinder 52. Packing material 54, such as an "O" ring, seals the piston 50 against the cylinder walls thereby forming an extend chamber 56 and a retract chamber 58. A rod 60 extending from the piston 50 connects through suitable linkage to an aircraft spoiler (not shown).

As shown, hydraulic fluid is coupled to the actuator extend chamber 56 directly from the output port 42 of the control valve 10 whereas fluid from the retract chamber 58 passes through the integral blocking and relief valve 12 before reaching the control valve. Thus, the blocking and relief provided by valve 12 operates on fluid in the actuator retract chamber 58.

The preferred construction of the integral blocking and relief valve 12 includes an input port 70 which couples fluid to a first chamber 72. A first piston $P_A$ is slidably constrained in the first chamber 72. At its first end 74 the piston $P_A$ has an area $A_A$ exposed to hydraulic fluid coupled through the input port 70. Suitable packing 76 seals the piston $P_A$ in its chamber 74.

A second piston $P_B$ has a first portion 80 which is slidably constrained in a pressure relief chamber 83. Suitable packing 84 seals the first portion 80 within the chamber 83.

Integral with the first portion 80 of the second piston $P_B$ is a second portion 82. Second portion 82 is slidably constrained in, and exposes a total area $A_{SB}$ to a relief bias chamber 86. Suitable packing 88 seals the second portion 82 within the chamber 86.

A plunger 90 extends from the second end of the first portion 80. A second input port 92 connects to the pressure relief chamber 82 and, as shown, is coupled to an output port 40 of control valve 10.

A pressure bias port 100, which connects to the metered system high pressure output port 37 of control valve 10, accesses a pressure bias chamber 102. The pressure bias chamber 102 joins the first chamber 72 with the relief bias chamber 86 such that the second end 75 of the first piston $P_A$ can abut the free end of the second portion 82.

A relief port 120, which connects to system return pressure via port 36 of control valve 10, connects to the relief bias chamber 86.

A poppet valve 130 is slidably constrained in a poppet chamber 132. The poppet chamber 132 joins with the pressure relief chamber 83 and the first input port 70 such that hydraulic fluid at the first input port 70 is controllably passed to the pressure relief chamber dependent upon the position of the poppet 130.

The poppet 130 has a face portion 134 which exposes an effective area $A_P$ to the pressure relief chamber. Further, the poppet face portion 134 is engagable by the plunger portion 90 of the second piston $P_B$ such that the poppet may be driven to a position allowing the flow from the input port 70 to the pressure relief chamber 83.

A passageway 136 provided in the poppet 132 allows equalization of hydraulic pressure throughout the poppet chamber 132.

A spring pair 140 biases the second piston $P_B$ out of engagement with the poppet 130. A second spring pair 142 biases the poppet 130 such that it tends to block fluid flow from the first input port 70 to the pressure relief chamber 83.

SYSTEM OPERATION

Figure 2:
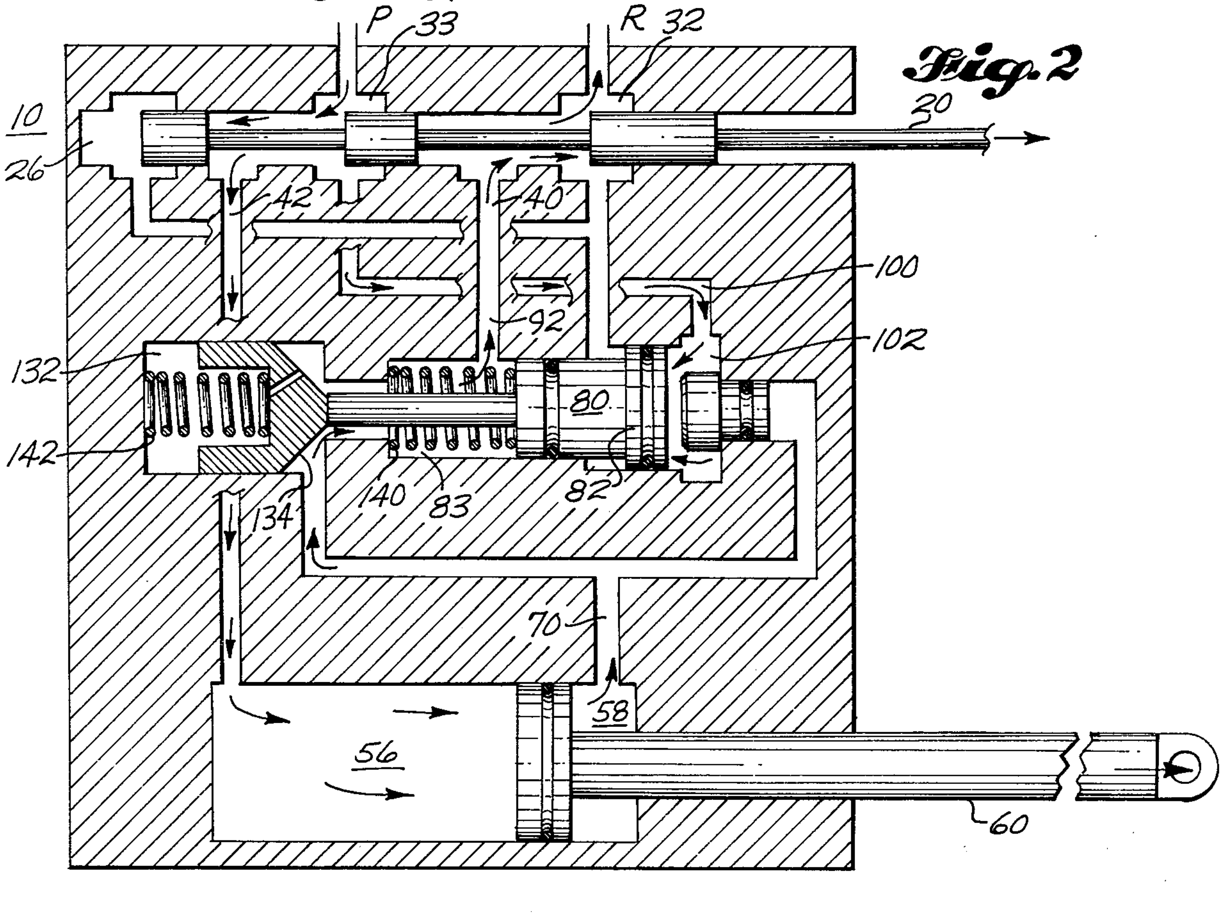
FIG. 2 illustrates operation of the system shown in FIG. 1 in the spoiler extend mode.
Figure 3:
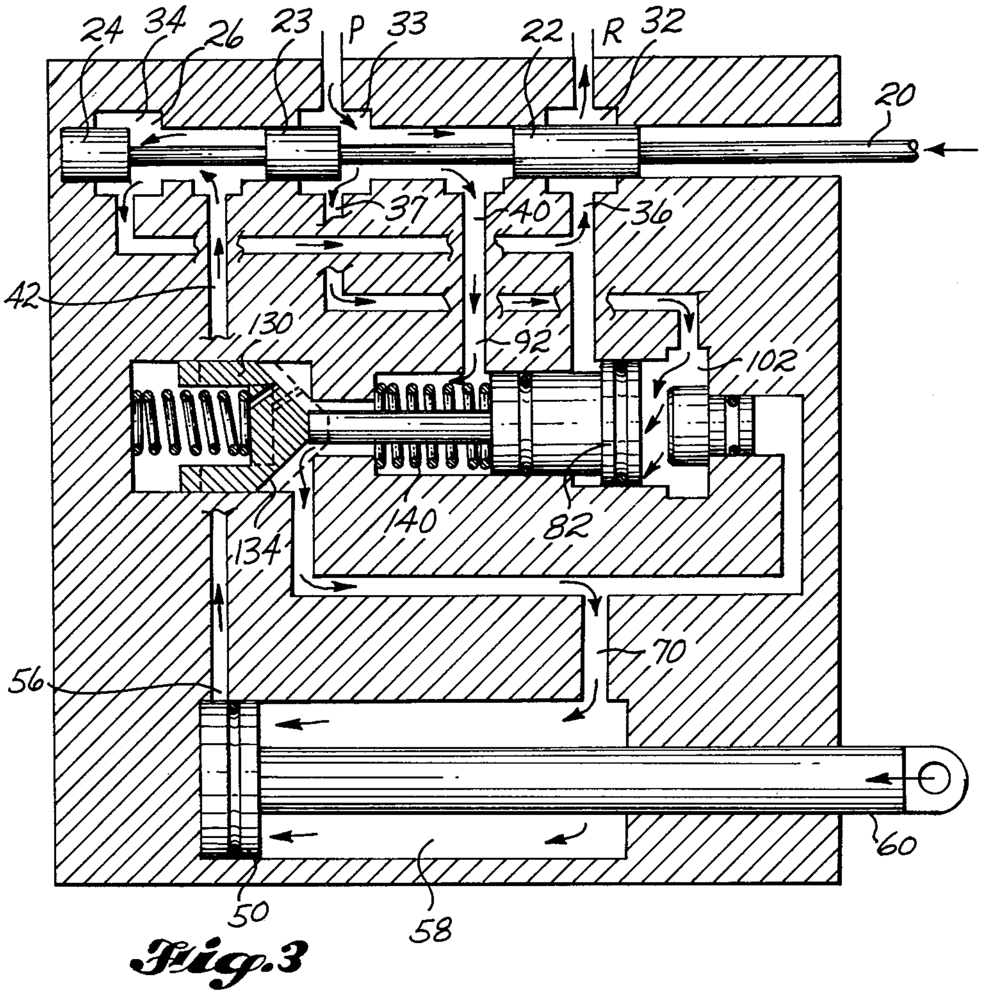
FIG. 3 illustrates the system of FIG. 1 in the spoiler retract mode and also shows the blocking and relief characteristics of the valve.

Identical reference numerals are used throughout FIGS. 2 and 3 to correspond to identical parts shown in FIG. 1.

FIG. 2 illustrates operation of the system shown in FIG. 1 in the cylinder extend mode. Here, via a suitable control (not shown) from the flight deck, the control valve spool 20 slides to the right within cylinder 26. Thus, the system pressure P forces hydraulic fluid into the cavity 33, out output port 42 and into the extend chamber 56 of the actuator 14.

Thus, the piston 50 is driven to the right whereby rod 60 deflects the spoiler (not shown) to its extend position.

Fluid in the retract chamber 58 is routed to the first input port 70 where it is coupled both to the exposed area $A_A$ of the first piston $P_A$ and to the poppet chamber 132.

Also, system high pressure is routed through the pressure bias port 100 to the pressure bias chamber 102. In this mode, the net forces on the second piston $P_B$ are sufficient to overcome the forces due to the spring pair 140 such that second piston $P_B$ is deflected to the left. In so doing, the plunger 90 engages the poppet 130 such that it is driven to the left in opposition to its spring pair 142. Now, fluid from the retract chamber 58 is permitted to flow from the first input port 70 to the pressure relief chamber 83. The fluid then flows out port 92 and into port 40 of control valve 10 and, finally, out of cavity 32 to the system return reservoir.

FIG. 3 illustrates operation of the system in the cylinder retract mode. Here, a suitable signal from the flight deck moves the spool 20 to the left within cylinder 26 of control valve 10. This allows fluid in the extend chamber 56 to pass into control valve port 42, chamber 34 and through port 36 to chamber 32 and, thus, to system return pressure. The piston 50 moves to a "bottomed" position within its cylinder thereby activating the spoiler (not shown) to its retract position. Fluid pressure in the retract chamber 58 rises to system pressure.

Now, system pressure as metered through cavity 33, output port 40 and second input port 92, along with the force exerted by the spring pair 140 drives the second piston $P_B$ to the right against system pressure in the pressure bias chamber 102. This results in the poppet 130 closing (shown in dashed lines) thereby acting as a blocking valve to prevent movement of the piston 50 (and, thus, the spoiler) due to loads on the spoiler.

By design, the exposed area $A_A$ of the first piston $P_A$ is greater than the exposed area on the face 134 of the poppet 130. Thus, if pressure in the retract chamber 58 exceeds a predetermined level due to thermal effects or external loading, then this pressure acting on the differential area $A_A - A_P$ creates a force urging the first piston $P_A$ to the left contacting piston $P_B$ and driving the second piston $P_B$ to the left opening the poppet 130 and thereby relieving the trapped pressure into chamber 83 and, via port 92 and control valve 10, to the hydraulic system.

A particular feature of the invention is that the stepped area $A_{SB}$ of the second portion 82 of the second piston $P_B$ referenced to return is related to the exposed area $A_A$ of the first piston $P_A$ and to the exposed area $A_P$ of the poppet 130 by the relationship:

$$A_{SB} \simeq A_A - A_P. \quad [1]$$

This relationship assures that pressure in the retract chamber 58 will be relieved independent of the value of system pressure.

Ideally, ignoring friction, this may be understood as follows. For the condition of zero system pressure, the system will provide relief (i.e. poppet 130 will begin to open) in accordance with the following relationship:

$$P_R = F_S/(A_A - A_P) \quad [2]$$

where $P_R$ = relief pressure and

Fs = spring force.

For the condition of an existing system pressure $P_S$, and ignoring the force resulting from the stepped area $A_{SB}$ of the second piston $P_B$, pressure relief would be provided in accordance with the following relationship:

$$P_R = [F_S/(A_A - A_P)] + P_S. \quad [3]$$

Comparing the above relationships, it is apparent that relief pressure is directly related to system pressure.

Assuming a given system pressure $P_S$ and assuming that return pressure is equal to zero, the following relationship, taking into account the contribution from the stepped area $A_{SB}$, may be shown:

$$(P_R - P_S)(A_A - A_P) + P_S A_{SB} = F_S. \quad [4]$$

Assuming $$A_{SB} \approx A_A - A_P, \quad [5]$$

the expression for the relief pressure reduces to:

$$P_R = F_S/(A_A - A_P). \quad [6]$$

Comparing this last equation with the above equation for the condition wherein system pressure is zero, it can be seen that due to the contribution of the stepped area $A_{SB}$ the present unique valve design relieves system pressure at the same, predetermined level, independent of any influence due to system pressure.

In summary, an improved integral blocking and relief valve has been shown which provides pressure relief at a value independent of system pressure levels. In addition, the valve utilizes relatively few parts and, as such, is simple to construct and relatively reliable in use.

While a preferred embodiment of the invention has been described in detail, it should be apparent that many modifications and variations thereto are possible, all of which are within the true spirit and scope of the invention.

For example, while fluid blocking in the retract position of the spoiler has been described, it is apparent that such blocking could be provided in the extend position.

I claim:

1. An integral blocking and relief valve for blocking the flow of hydraulic fluid unless the pressure of said fluid exceeds a predetermined value, comprising:

a first input port adapted to be connected to the hydraulic fluid source to be blocked and relieved;

a first piston $P_A$ slidably constrained in a first chamber, said first chamber being connected to said first input port and said piston $P_A$ having an area $A_A$ at a first end, said area $A_A$ being exposed to hydraulic pressure in said first chamber;

a second piston $P_B$ having a first portion being slidably constrained in a pressure relief chamber and a second portion integral with the first end of said first portion and being slidably constrained in, and exposing an area $A_{SB}$ to a relief bias chamber, said second piston $P_B$ further comprising a plunger portion extending from the second end of said first portion;

a second input port connected to said pressure relief chamber and adapted to be connected to a system controlled hydraulic flow line;

a pressure bias port adapted to be connected to a source of system hydraulic pressure;

a bias chamber connected to said pressure bias port and joining said first chamber with said relief bias chamber such that the second end of said first piston $P_A$ can abut the free end of said second portion;

a relief port connected to said relief bias chamber and adapted to be connected to a system return pressure; and a poppet valve being slidably constrained in a poppet chamber, said poppet chamber joining with said pressure relief chamber and said first input port such that hydraulic fluid at said first input port is controllably passed to said pressure relief chamber dependent on the position of said poppet, said poppet exposing an area $A_p$ to said pressure relief chamber and being engageable by said plunger portion of the second piston to drive the poppet to a position to allow flow from said input port to said pressure relief chamber, said relief bias chamber being directly connected to the system return pressure in all positions of the poppet valve the first piston exposed area $A_A$, the poppet exposed area $A_p$ and the second piston second portion exposed $A_{SB}$ being defined by:

$$A_{SB} \approx A_A - A_p$$

whereby the poppet is driven to allow flow from the first input port to the relief chamber at a predetermined pressure of fluid in said first input port independent of the level of system pressure.

2. The integral blocking and relief valve of claim 1 further comprising:

first spring bias means for biasing said second piston such that the plunger is out of engagement with the poppet; and second spring bias means for biasing said poppet to block flow from said input port to said pressure relief chamber.

* * * * *